(12) United States Patent
Kim

(10) Patent No.: US 8,995,083 B2
(45) Date of Patent: Mar. 31, 2015

(54) SPINDLE MOTOR AND HARD DISK DRIVE INCLUDING THE SAME

(71) Applicant: Samsung Electro-Mechanics Co., Ltd., Suwon (KR)

(72) Inventor: Duck Young Kim, Suwon (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 13/973,441

(22) Filed: Aug. 22, 2013

(65) Prior Publication Data

US 2014/0313612 A1   Oct. 23, 2014

(30) Foreign Application Priority Data

Apr. 23, 2013 (KR) .......................... 10-2013-0044786
Jun. 14, 2013 (KR) .......................... 10-2013-0068172

(51) Int. Cl.
G11B 17/02 (2006.01)
G11B 19/20 (2006.01)
F16C 32/06 (2006.01)

(52) U.S. Cl.
CPC ............ *G11B 19/2036* (2013.01); *F16C 32/06* (2013.01)
USPC ..................................................... 360/99.08

(58) Field of Classification Search
None
See application file for complete search history.

(56) References Cited

U.S. PATENT DOCUMENTS

| 7,290,933 | B2 * | 11/2007 | Braun et al. | 384/107 |
| 7,345,392 | B2 * | 3/2008 | Hafen et al. | 310/90 |
| 8,599,513 | B1 * | 12/2013 | Kimura et al. | 360/97.11 |
| 2009/0080819 | A1 | 3/2009 | Rehm | |
| 2012/0049676 | A1 | 3/2012 | Lee et al. | |
| 2013/0194694 | A1 * | 8/2013 | Park | 360/75 |

FOREIGN PATENT DOCUMENTS

| JP | 2009-204019 | 9/2009 |
| KR | 10-2012-0019319 | 3/2012 |
| KR | 10-2013-0016806 | 2/2013 |

OTHER PUBLICATIONS

Korean Office Action issued on Jun. 2, 2014 in corresponding Korean Patent Application No. 10-2013-0068172.

* cited by examiner

*Primary Examiner* — K. Wong

(57) ABSTRACT

There are provided a spindle motor and a hard disk drive including the same. The spindle motor includes: a sleeve supporting a shaft so that an upper end of the shaft protrudes upwardly in an axial direction and a bearing clearance filled with a lubricating fluid formed between the sleeve and the shaft; a housing provided so as to enclose an outer peripheral surface of the sleeve and forming a circulation hole between the housing and the sleeve in the axial direction; and a rotor hub fixedly installed on an upper end portion of the shaft in the axial direction, wherein a connection part is formed between the housing and the rotor hub so as to allow a sealing part on which a liquid-vapor interface is disposed and the circulation hole to be in communication with each other.

9 Claims, 8 Drawing Sheets

SPINDLE MOTOR AND HARD DISK DRIVE INCLUDING THE SAME

CROSS-REFERENCE TO RELATED APPLICATIONS

This application claims the priority of Korean Patent Applications No. 10-2013-0044786 and No. 10-2013-0068172 filed on Apr. 23, 2013 and Jun. 14, 2013, respectively, in the Korean Intellectual Property Office, the disclosure of which is incorporated herein by reference.

BACKGROUND OF THE INVENTION

1. Field of the Invention

The present invention relates to a spindle motor and a hard disk drive including the same.

2. Description of the Related Art

In general, a small-sized spindle motor used in a hard disk drive (HDD) serves to rotate a disk so that a magnetic head may read data stored thereon or write data thereto.

In addition, the small-sized spindle motor includes a fluid dynamic bearing assembly, a bearing clearance provided in the fluid dynamic bearing assembly being filled with a lubricating fluid.

In addition, at the time of rotation of a shaft, the lubricating fluid filling the bearing clearance is pumped to form fluid dynamic pressure therein, thereby rotatably supporting the shaft.

However, pressure lower than atmospheric pressure, that is, negative pressure, may be generated in the bearing clearance by the pumping of the lubricating fluid at the time of rotation of the shaft.

In this case, air contained in the lubricating fluid may expand to form air bubbles. When these air bubbles are introduced into a groove pumping the lubricating fluid, sufficient fluid dynamic pressure may not be generated, and vibrations may be generated, such that the introduced air bubbles may deteriorate rotational characteristics.

Therefore, a circulation hole for reducing the generation of the negative pressure is formed in a sleeve, and the generation of negative pressure may be suppressed by the circulation hole.

A configuration in which a circulation hole for reducing the generation of negative pressure is formed to be inclined and to connect a bearing clearance formed by a sleeve and a cover member and a bearing clearance formed by a liquid-vapor interface to each other is disclosed in US Patent Laid-Open Publication No. 2009-0080819 (Related Art Document).

However, it may be difficult to process the circulation hole, and at the time of processing the circulation hole, a defect of the sleeve may be generated.

RELATED ART DOCUMENT (Patent Document 1) US Patent Laid-open Publication No. 2009-0080819

SUMMARY OF THE INVENTION

An aspect of the present invention provides a spindle motor capable of reducing a generation of negative pressure. That is, there is provided a spindle motor capable of easily connecting a sealing part in which a lipid-vapor interface is disposed and a lower end portion of a bearing clearance to each other.

In addition, an aspect of the present invention also provides a motor capable of easily discharging air included in a lubricating fluid. Particularly, according to the present invention, the air is able to be easily separated from the lubricating fluid, such that it may be easy to discharge the air, and air included in the lubricating fluid to be circulated in the bearing clearance again may be reliably removed.

Further, according to the present invention, since a sleeve is composed of a single member, a thrust dynamic pressure groove formation surface and a radial dynamic pressure groove formation surface may be processed so as to be accurately perpendicular to each other, thereby further improving bearing rigidity.

According to an aspect of the present invention, there is provided a spindle motor including: a sleeve supporting a shaft so that an upper end of the shaft protrudes upwardly in an axial direction and a bearing clearance filled with a lubricating fluid formed between the sleeve and the shaft; a housing provided so as to enclose an outer peripheral surface of the sleeve and forming a circulation hole between the housing and the sleeve in the axial direction; and a rotor hub fixedly installed on an upper end portion of the shaft in the axial direction, wherein a connection part is formed between the housing and the rotor hub so as to allow a sealing part on which a liquid-vapor interface is disposed and the circulation hole to be in communication with each other.

The connection part may be formed between a first facing surface provided in a circumferential direction at an outer side of the sleeve in a radial direction and a second facing surface provided in the circumferential direction inwardly of the housing in the radial direction so as to be spaced apart from the first facing surface by a predetermined interval.

An outer side of the connection part in the radial direction may be inclined upwardly in the axial direction.

A cover member preventing leakage of the lubricating fluid may be fixedly installed on a bottom surface of the housing.

The connection part may be opened between the sleeve and the housing in the radial direction.

At least one of a lower surface of the rotor hub and an upper surface of the sleeve facing the lower surface of the rotor hub may be formed with an upper thrust dynamic pressure groove for generating thrust fluid dynamic pressure.

A lower end of the shaft may be provided with a stopper protruding in an outer diameter direction to thereby be caught by a lower end of the sleeve.

At least one of a lower surface of the sleeve and an upper surface of the stopper facing the lower surface of the sleeve may be provided with a lower thrust dynamic pressure groove for generating thrust fluid dynamic pressure.

The connection part may be continuously provided in the circumferential direction.

According to another aspect of the present invention, there is provided a hard disk drive including: the spindle motor as described above rotating a disk by power applied through a substrate; a magnetic head writing data to and reading data from the disk; and a head transfer part transferring the magnetic head to a predetermined position above the disk.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
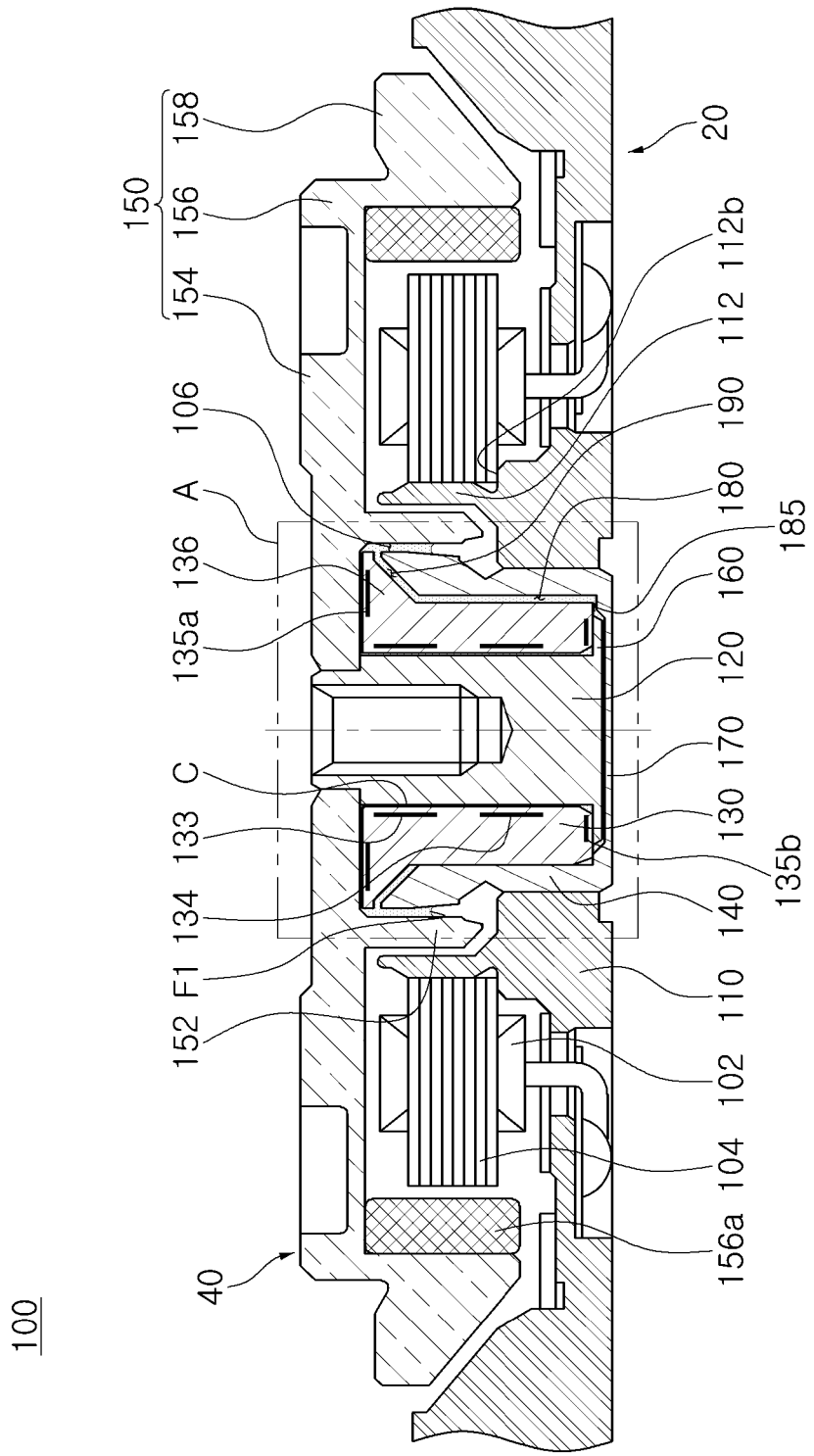
FIG. 1 is a schematic cross-sectional view showing a spindle motor according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

Figure 2:
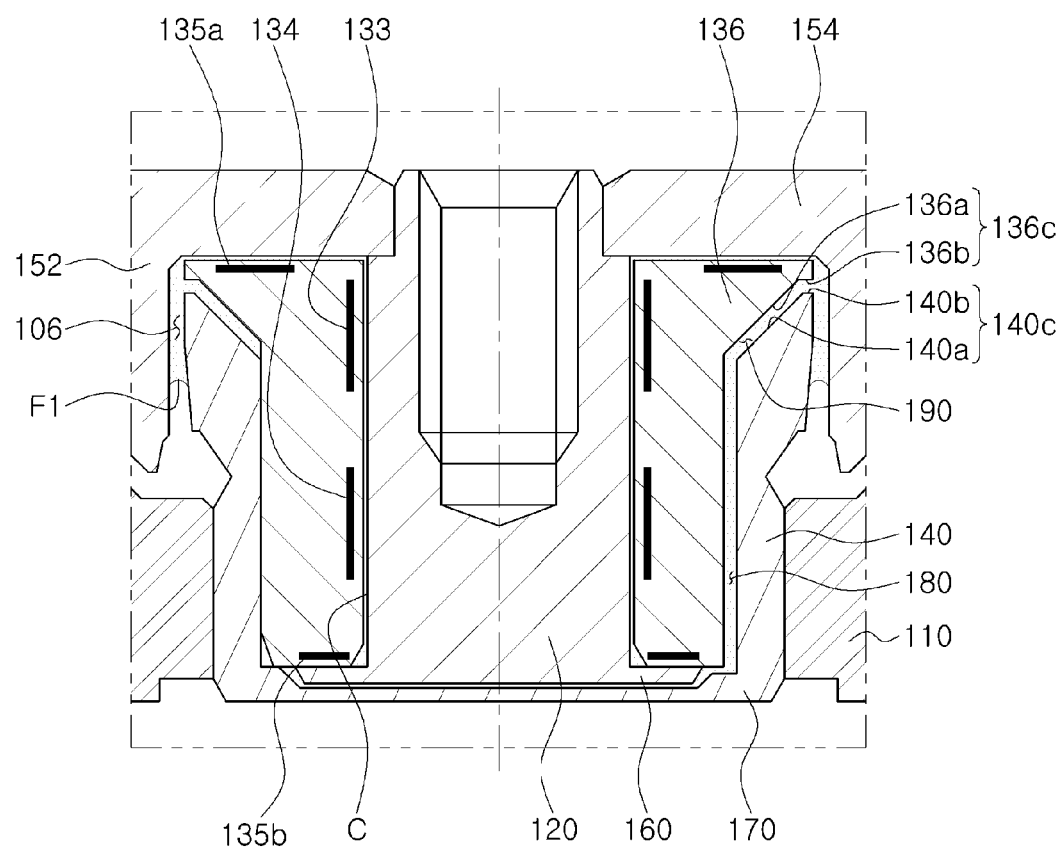
FIG. 2 is an enlarged view of part A of FIG. 1.
Figure 3:
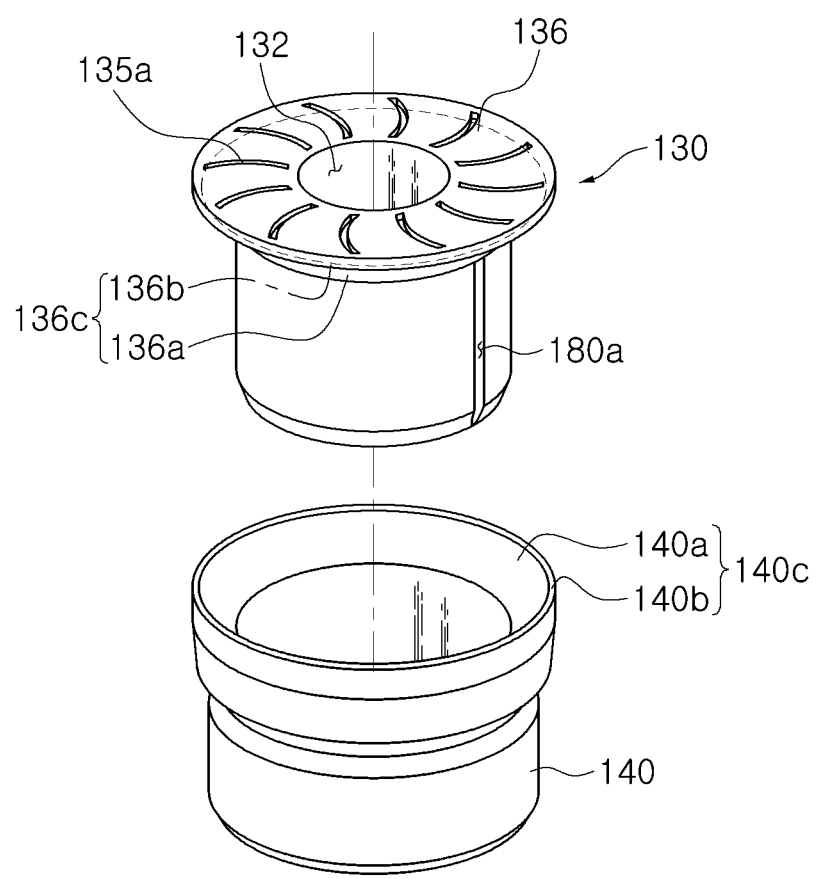
FIG. 3 is an exploded perspective view showing a sleeve and a housing included in the spindle motor according to the embodiment of the present invention.
Figure 4:
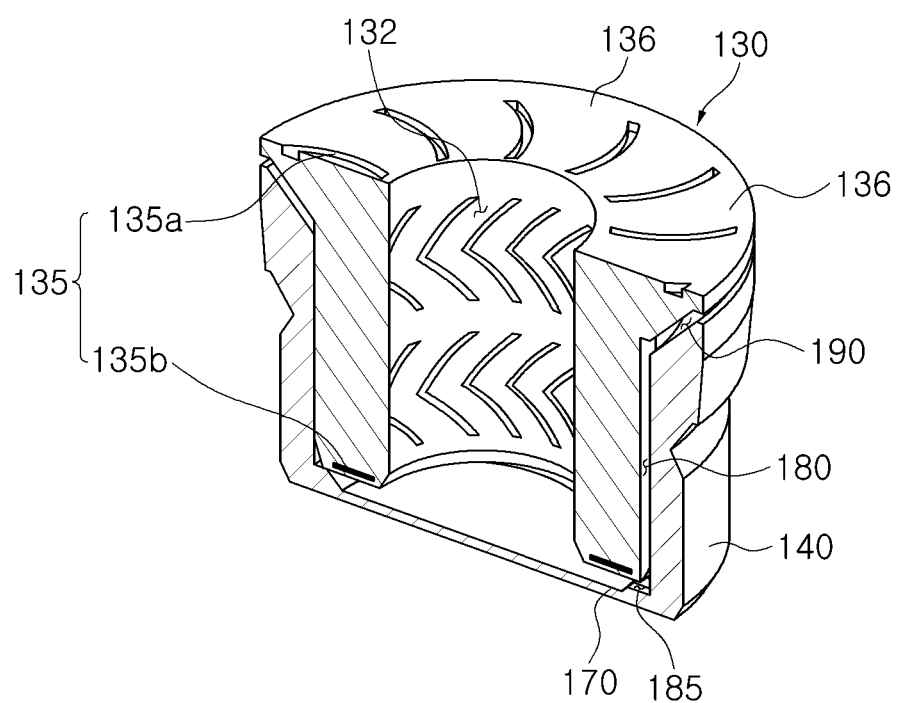
FIG. 4 is a perspective view showing a coupling relationship between the sleeve and the housing included in the spindle motor according to the embodiment of the present invention.

FIG. 1 is a schematic cross-sectional view showing a spindle motor according to an embodiment of the present invention; FIG. 2 is an enlarged view of part A of FIG. 1; FIG. 3 is an exploded perspective view showing a sleeve and a housing included in the spindle motor according to the embodiment of the present invention; and FIG. 4 is a perspective view showing a coupling relationship between the sleeve and the housing included in the spindle motor according to the embodiment of the present invention.

Referring to FIGS. 1 through 4, the spindle motor 100, according to the embodiment of the present invention, may include a base member 110, a shaft 120, a sleeve 130, a housing 140, a rotor hub 150, a stopper 160, and a cover member 170.

The spindle motor 100 may be a motor used in a hard disk drive driving a recordable disk.

Here, terms with respect to directions will be defined. As viewed in FIG. 1, an axial direction refers to a vertical direction, that is, a direction from a lower portion of the shaft 120 toward an upper portion thereof or a direction from the upper portion of the shaft 120 toward the lower portion thereof, and a radial direction refers to a horizontal direction, that is, a direction from an outer peripheral surface of the rotor hub 150 toward the shaft 120 or from the shaft 120 toward the outer peripheral surface of the rotor hub 150.

In addition, a circumferential direction refers to a circumferential direction of a circle having a predetermined radius based on a rotational shaft. For example, the circumferential direction refers to a rotation direction along an outer peripheral surface of the rotor hub 150 or the shaft 120.

Further, in the present invention, a fluid dynamic bearing assembly, including members associated with the principle of the bearing utilizing dynamic pressure of a fluid, may include members other than the base member 110. That is, the fluid dynamic bearing assembly may include the shaft 120, the sleeve 130, the housing 140, the rotor hub 150, the stopper 160, and the cover member 170.

The base member 110, a fixed member, may configure a stator 20. Here, the stator 20, all fixed members except for a rotating member, may include the base member 110, the sleeve 130, the housing 140, and the like.

In addition, the base member 110 may include an installation part 112 having the housing 140 insertedly installed therein. The installation part 112 may protrude upwardly in the axial direction and include an installation hole 112a formed therein so that the housing 140 may be insertedly installed therein.

In addition, the installation part 112 may include a seat surface 112b formed on an outer peripheral surface thereof so that a stator core 104 having a coil 102 wound therearound may be seated thereon. That is, the stator core 104 may be fixedly installed on the outer peripheral surface of the installation part 112 by an adhesive in a state in which it is seated on the seat surface 112b.

However, the stator core 104 may also be installed on the outer peripheral surface of the installation part 112 in a press-fitting scheme without using the adhesive. That is, a scheme of installing the stator core 104 is not limited to a scheme using the adhesive.

In addition, the base member 110 may be manufactured by die-casting using aluminum (Al). Alternatively, the base member 110 may also be molded by performing plastic processing (for example, press processing) on a steel plate. That is, the base member 110 may be manufactured by various materials and various processing methods, and is not limited to the base member 110 shown in the accompanying drawings.

The shaft 120, a rotating member, may configure a rotor 40. Here, the rotor 40 is a member rotatably supported by the stator 20 to thereby rotate. Meanwhile, the shaft 120 may be rotatably supported by the sleeve 130.

Meanwhile, the shaft 120 may include upper and lower radial dynamic pressure grooves (not shown) formed in the outer peripheral surface thereof in order to generate fluid dynamic pressure at the time of the rotational driving of the shaft 120. For convenience, the case in which the upper and lower radial dynamic pressure grooves 133 and 134 are formed in an inner surface of the sleeve 130 is shown in the accompanying drawings. In addition, the upper and lower radial dynamic pressure grooves may be disposed to be spaced apart from each other by a predetermined interval and have a herringbone pattern, a spiral pattern, a helical pattern, or the like.

Meanwhile, a lower end portion of the shaft 120 may be provided with the stopper 160 caught by a lower end of the sleeve 130 to prevent the shaft 120 from being excessively floated. That is, the stopper 160 is provided so as to protrude from the lower end of the shaft 120 in an outer diameter direction and positioned at a lower portion of the sleeve 130 to thereby limit excessive floating of the rotating member including the shaft 120, at the time of operation of the motor. Meanwhile, an upper surface of the stopper 160 facing a lower surface of the sleeve 130 may be provided with a lower thrust dynamic pressure groove 135b as described above.

The sleeve 130, a fixed member configuring the stator 20 together with the housing 140 and the base member 110, may rotatably support the shaft 120 and form a bearing clearance C filled with a lubricating fluid. The sleeve 130 may be formed by sintering an Cu—Fe-based alloy powder or an SUS-based powder. Of course, a manufacturing method of the sleeve 130 is not limited to the sintering method, but a different method may also be used.

Meanwhile, the sleeve 130 may be inserted into the installation part 112 of the base member 110 in a state in which the sleeve 130 is fixed to an inner portion of the housing 140 to thereby be indirectly fixedly installed on the base member 110. That is, an outer peripheral surface of the housing 140 may be adhered to an inner peripheral surface of the installation part 112 by an adhesive or by another method.

In addition, the sleeve 130 may include a shaft hole 132 formed therein so that the shaft 120 can be inserted thereinto. Further, in the case in which the shaft 120 is inserted into the shaft hole 132 of the sleeve 130, an inner peripheral surface of the sleeve 130 and the outer peripheral surface of the shaft 120 may be spaced apart from each other by a predetermined interval to form the bearing clearance C therebetween.

Here, the bearing clearance C will be described in greater detail. As described above, the sleeve 130 may form the bearing clearance C filled with the lubricating fluid. This bearing clearance C may mean a clearance formed by the shaft 120 and the sleeve 130, a clearance formed by an upper end portion of the sleeve 130 and the rotor hub 150, a clearance formed by the housing 140 and the stopper 160, a clearance formed by the sleeve 130 and an extension wall part 152, and a clearance formed by the cover member 170 and a lower surface of the shaft 120.

In addition, the spindle motor 100 according to the embodiment of the present invention may have a structure in which the lubricating fluid fills the entire bearing clearance C. This structure may be called a full-fill structure.

Meanwhile, the sleeve 130 may include the upper and lower radial dynamic pressure grooves 133 and 134 formed in the inner surface thereof in order to generate fluid dynamic pressure at the time of the rotational driving of the shaft 120. In addition, the upper and lower radial dynamic pressure grooves 133 and 134 may be disposed to be spaced apart from each other by a predetermined interval and have a herringbone pattern, a spiral pattern, a screw pattern, or the like.

Further, an upper or lower surface of the sleeve in the axial direction may be provided with a thrust dynamic pressure groove 135 for forming fluid dynamic pressure at the time of the rotational driving of the rotor hub 150. In more detail, the upper surface of the sleeve 130 facing the rotor hub 150 may be provided with an upper thrust dynamic pressure groove 135a for forming the fluid dynamic pressure at the time of the rotational driving, and the lower surface of the sleeve 130 facing the stopper 160 may be provided with the lower thrust dynamic pressure groove 135b for forming the fluid dynamic pressure at the time of the rotational driving. That is, the upper and lower thrust dynamic pressure grooves 135a and 135b may be simultaneously provided to form a double thrust structure. The thrust dynamic pressure groove 135 may have a herringbone pattern, a spiral pattern, a screw pattern, or the like. In addition, although not shown, the upper thrust dynamic pressure groove 135a may also be provided in a lower surface of the rotor hub 150 facing the upper surface of the sleeve 130 as well as the upper surface of the sleeve 130. Further, the lower thrust dynamic pressure groove 135b may also be provided in an upper surface of the stopper 160 facing the lower surface of the sleeve 130 as well as the lower surface of the sleeve 130.

In the spindle motor 100 according to the present invention, since the sleeve 130 is provided as a single body, the sleeve 130 may be processed so that the inner surface of the sleeve 130 in the radial direction and the upper surface of the sleeve in the axial direction are accurately perpendicular to each other. Therefore, the upper and lower radial dynamic pressure grooves 133 and 134 and the thrust dynamic pressure groove 135 may be formed while being accurately perpendicular to each other, such that bearing rigidity of the spindle motor may be improved, thereby ultimately improving performance of the motor.

The sleeve 120 may include a circulation hole 180 between the sleeve 120 and an inner surface of a housing 140 to be described below. The circulation hole 180 may be extended from the lower surface of the sleeve 120 in the axial direction.

Various formation examples of the circulation hole 180 will be described below with reference to FIGS. 5A through 5C.

In addition, a connection part 190 connected to the circulation hole 180 may be formed between the sleeve 120 and the housing 140. The connection part 190 may be formed by an outer surface of the housing 140 and an inner surface of the extension wall part 152 of the rotor hub 150 and serve to allow a sealing part 106 in which a liquid-vapor interface F1 is disposed and the circulation hole 180 to be in communication with each other.

That is, the sleeve 120 may include a flange part 136 protruding in the outer diameter direction at an upper portion thereof in the axial direction. An outer side surface of the flange part 136 in the radial direction may be formed as a first facing surface 136c including a first inclined surface 136a having a diameter increasing from a lower portion thereof toward an upper portion thereof in the axial direction and a first horizontal surface 136b provided at an upper end portion of the first inclined surface 136a in the axial direction so as to be extended in the outer diameter direction.

In addition, an inner surface of the housing 140 in the radial direction may be formed as a second facing surface 140c including a second inclined surface 140a having a diameter increasing from a lower portion thereof toward an upper portion thereof in the axial direction and a second horizontal surface 140b provided at an upper end portion of the second inclined surface 140a in the axial direction so as to be extended in the outer diameter direction.

Further, the first facing surface including the inclined surface 136a and the first horizontal surface 136b of the sleeve 120 may face the second facing surface 140c including the second inclined surface 140a and the second horizontal surface 140b of the housing 140. That is, the first and second facing surfaces 136c and 140c may be disposed to be spaced apart from each other by a predetermined interval, thereby forming the connection part 190 between the corresponding members. The connection part 190 may have a continuous ring shape (annular shape) in the circumferential direction.

Here, although not shown, the first facing surface 136c may be provided with only the first inclined surface 136a up to an outer end portion thereof in the radial direction. In this case, the second facing surface 140c may only be provided with the second inclined surface 140a up to an outer end portion thereof in the radial direction. That is, in this case, the connection part 190 may only be configured of inclined portions except for horizontal portions.

As described above, the first and second facing surfaces 136c and 140c may form the connection part 190 in the upper portions of the sleeve 120 and the housing 140 in the axial direction to connect the circulation hole 180 and the sealing part 106 to each other.

As a result, since the bearing clearance formed by the cover member 170 and the lower surface of the shaft 120 and the sealing part 106 may be in communication with each other by the connection part 190, generation of negative pressure may be reduced.

In other words, since the bearing clearance formed by the cover member 170 and the lower surface of the shaft 120 and the sealing part 106 may be in communication with each other by the circulation hole 180 and the connection part 190, generation of negative pressure in the bearing clearance formed by the cover member 170 and the lower surface of the shaft 120 may be reduced.

In addition, the connection part 190 may have the continuous ring shape (annular shape) in the circumferential direction, such that the extension wall part 152 of the rotor hub 150, the rotating member, and the connection part 190 may continuously face each other in the circumferential direction. Therefore, the fluid may smoothly flow, such that additional generation of air bubbles may be suppressed. In other words, in the case in which the connection part does not have the continuous ring shape in the circumferential direction but has a shape in which the connection part is in communication with the sealing part only at a predetermined point in the radial direction, a fluid provided in the connection part and a fluid provided in the sealing part 106 may flow differently—the fluid in the connection part may not rotate in the circumferential direction, but the fluid in the sealing part 106 may rotate in the circumferential direction—, such that air bubbles may be additionally formed.

Therefore, the air bubbles generated in the bearing clearance may be more smoothly discharged to the outside of the bearing clearance by a structure of the connection part 190 according to the present embodiment.

The housing 140 may be coupled to an outer peripheral surface of the sleeve 130 in a shape in which the housing encloses the sleeve 130. More specifically, the sleeve 130 may be inserted into the inner peripheral surface of the housing 140 and coupled thereto by a press-fitting or bonding method. Since the upper end portion of the sleeve 130 needs to be exposed, the housing 140 may be coupled to the sleeve 130 except for a part of an outer side surface of the upper end portion of the sleeve 130. In more detail, the upper end portion of the sleeve 130 may be provided with the flange part 136 protruding in the outer diameter direction, and the upper end portion of the flange part 136 may be provided with the first horizontal surface 126b protruding toward an upper end portion of the housing 140 in the outer diameter direction.

The housing 140 may be coupled to the outer peripheral surface of the sleeve 130 to thereby prevent leakage of oil.

In addition, the liquid-vapor interface F1, a boundary between oil and air, may be formed between the outer side surface of the upper end portion of the housing 140 and the extension wall part 152 protruding downwardly from the rotor hub 150 in the axial direction. That is, the oil may be filled in the bearing clearance C, and the oil filled in the bearing clearance C may be sealed by a capillary phenomenon. In the present embodiment, the sealing part 106 of the fluid may be formed between the outer side surface of the housing 140 and the inner surface of the extension wall part 152. A position of an oil interface may be changed according to whether or not the motor is in an operation state.

Therefore, the outer side surface of the upper end portion of the housing 140 or the inner surface of the extension wall part 152 may be tapered so that the oil may be easily sealed. That is, the outer side surface of the upper end portion of the housing 140 or the inner surface of the extension wall part 152 may be formed to be inclined so that the interface between the lubricating fluid and the air may be easily formed.

Meanwhile, the cover member 170 may be installed at a lower end portion of the housing 140.

The cover member 170, a fixed member configuring the stator 20 together with the base member 110, the sleeve 130, and the housing 140, may be installed at the lower end portion of the housing 140 to thereby serve to prevent the lubricating fluid filled in the bearing clearance C from being leaked to the lower end portion of the housing 140.

Here, the cover member 170 may be bonded to a lower end of the housing 140 by an adhesive and/or welding.

In addition, the cover member 170 may be provided integrally with the housing 140. In the case in which the housing 140 and the cover member 170 are provided integrally with each other, the housing 140 and the cover member 170 may be manufactured integrally with each other by press-forming.

In addition, a through part 185 for connecting the bearing clearance formed by the cover member 170 and the stopper 160 to a lower end portion of the circulation hole 180 may be provided between the bottom surface of the cover member 170 and the lower surface of the sleeve 130 in the axial direction. The through part 185 may be formed in a portion at which the sleeve 130 and the cover member 170 face each other. Therefore, the through part 185 may be provided as a through groove 185a provided in an upper surface of the cover member 170 in the axial direction. However, the through part 185 is not limited thereto but may be provided as a through groove (not shown) provided in the lower surface of the sleeve 130 in the axial direction.

The rotor hub 150, a rotating member configuring the rotor 40 together with the shaft 120, may be coupled to an upper end portion of the shaft 120 and include an extension wall part 152 extended so as to be disposed at an outer side of the sleeve 130.

Meanwhile, the rotor hub 150 may include a rotor hub body 154 provided with an mounting hole 154a into which the upper end portion of the shaft 120 is inserted, a magnet mounting part 156 extended downwardly from an edge of the rotor hub body 154 in the axial direction, and a disk seat part 158 extended from a distal end of the magnet mounting part 156 in the outer diameter direction.

In addition, the magnet mounting part 156 may have a driving magnet 156a installed on an inner surface thereof, wherein the driving magnet 156a is disposed to face a front end of the stator core 104 having the coil 102 wound therearound.

Meanwhile, the driving magnet 156a may have an annular ring shape and be a permanent magnet generating magnetic force having a predetermined strength by alternately magnetization of an N pole and an S pole in a circumferential direction.

Here, rotational driving of the rotor hub 150 will be briefly described. When power is supplied to the coil 102 wound around the stator core 104, driving force capable of rotating the rotor hub 150 may be generated by electromagnetic interaction between the driving magnet 156a and the stator core 104 having the coil 102 wound therearound.

Therefore, the rotor hub 150 may rotate. In addition, the shaft 120 to which the rotor hub 150 is fixedly installed may rotate together with the rotor hub 150 by the rotation of the rotor hub 150.

In addition, the above-mentioned extension wall part 152 may be extended downwardly from a bottom surface of the rotor hub body 154 in the axial direction.

A part of the extension wall part 152 may face the outer side surface of the upper end portion of the sleeve 130, and a part thereof may be disposed on an outer side of the housing 140. That is, since the upper end portion of the sleeve 130 protrudes toward the upper end of the housing 140, the lubricating fluid may be filled in the bearing clearance formed between the upper end portion of the sleeve 130 directly facing the extension wall part 152 and the extension wall part 152.

Meanwhile, the rotor hub 150 may be provided integrally with the shaft 120.

In addition, the upper thrust dynamic pressure groove 135a for generating thrust fluid dynamic pressure may be formed in at least one of the bottom surface of the rotor hub body 154 facing the upper surface of the sleeve 130 and the upper surface of the sleeve 130. Although the case in which the upper thrust dynamic pressure groove 135a is formed in the sleeve 130 is shown in the accompanying drawings, the case is only one example, but the upper thrust dynamic pressure groove 135a may be provided in the rotor hub body 154.

Therefore, at the time of the rotation of the shaft 120, the thrust fluid dynamic pressure is generated, whereby the rotation of the rotor hub 150 may be more stably supported.

Figure 5A:
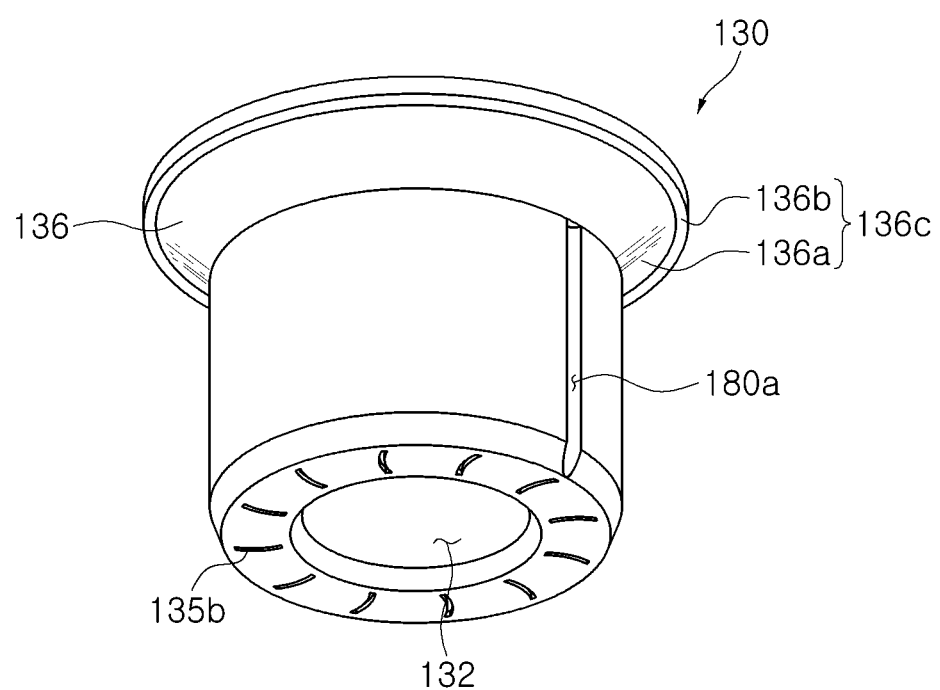
FIGS. 5A through 5C are reference views showing various examples of a circulation hole formed in the spindle motor according to the embodiment of the present invention.
Figure 5B:
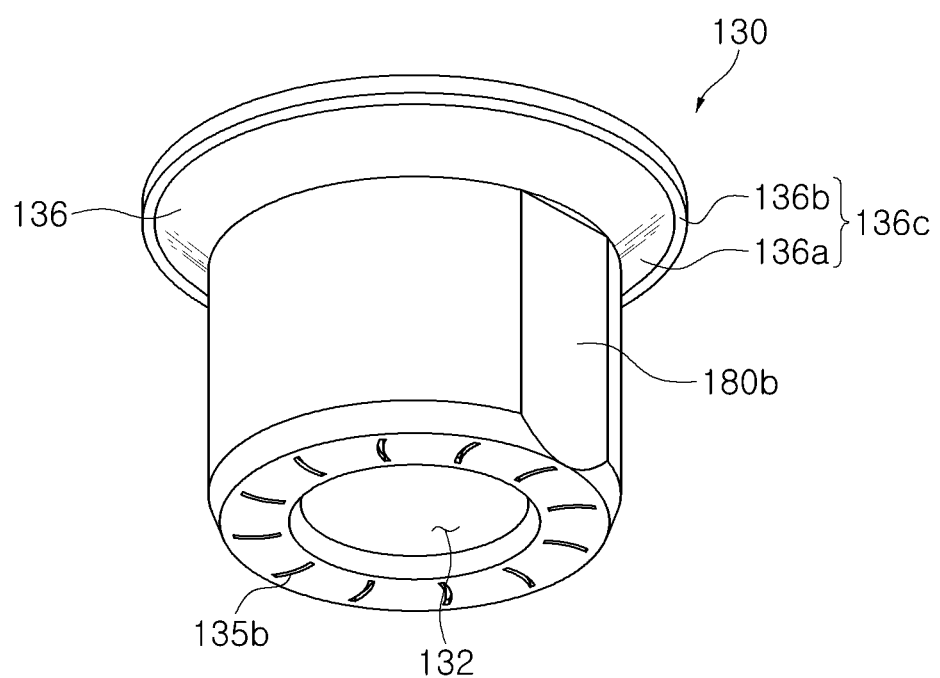
Figure 5C:
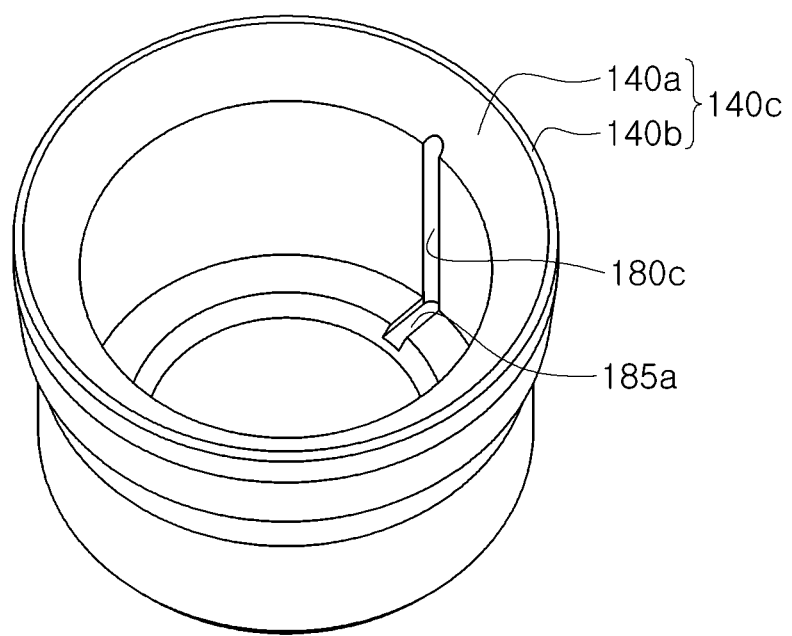

FIGS. 5A through 5C are reference views showing various examples of a circulation hole formed in the spindle motor according to the embodiment of the present invention.

The circulation hole 180 allowing the lower portion of the sleeve 130 and a lower end of the connection part 190 in the axial direction to communicate with each other may be provided between the sleeve 130 and the housing 140.

Referring to FIG. 5A or 5B, the circulation hole 180 may be provided as a circulation groove 180a or a cutting part 180b provided in the outer surface of the sleeve 130.

In the case in which the circulation hole 180 is provided as the circulation groove 180a having a groove shape formed along the outer surface of the sleeve 130 so as to allow the upper and lower portions to be in communication with each other, the continuous groove in the axial direction may be formed in the side surface of the sleeve 130. Of course, since it is sufficient that the circulation hole 180 is in communication with the connection part 190, the circulation groove 180a may be formed up to a portion at which the lower end of the connection part 190 is positioned.

Further, in the case in which the circulation hole 180 is provided as the cutting part 180b having a cut side shape formed along the outer peripheral surface of the sleeve 130 so as to allow the upper and lower portions to be in communication with each other, the cutting part 180b may be formed by partially cutting the side surface in the axial direction. Since the outer peripheral surface of the sleeve 130 and the inner peripheral surface of the housing 140 may be provided in a circular shape, when the outer peripheral surface of the sleeve 130 is cut in the axial direction, naturally, a space spaced apart from the housing 140 may be formed, thereby providing the circulation hole 180. In this case, since the housing 140 does not enclose the entire outer side surface of the sleeve 130, the cutting part 180b may be formed up to a portion at which the upper end of the housing 140 is positioned.

Next, referring to FIG. 5C, the circulation hole 180 may be provided as a circulation groove 180c provided in the inner surface of the housing 140.

In the case in which the circulation hole 180 is provided as the circulation groove 180c having a groove shape formed along the inner surface of the housing 140 so as to allow the upper and lower portions to be in communication with each other, a groove continuous in the axial direction may be formed in the inner surface of the housing 140. Of course, since it is sufficient that the circulation hole 180 is in communication with the connection part 190, the circulation groove 180c may be formed up to the portion at which the lower end of the connection part 190 is positioned.

Figure 6:
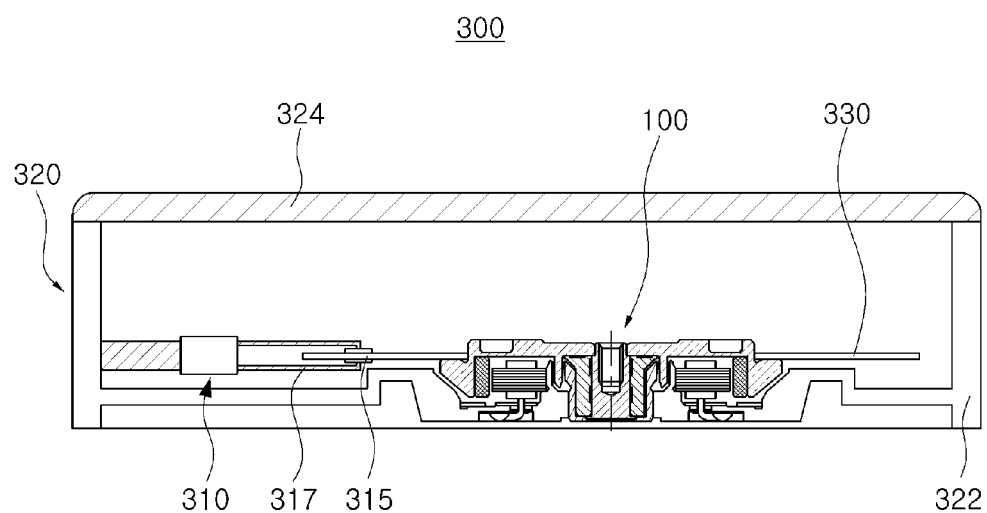
FIG. 6 is a schematic cross-sectional view of a disk driving device using the spindle motor according to the embodiment of the present invention.

Referring to FIG. 6, a recording disk driving device 300 including the spindle motor 100 according to the embodiment of the present invention mounted therein may be a hard disk driving device and include the spindle motor 100, a head transfer part 310, and a housing 320.

The spindle motor 100 has all the characteristics of the motor according to the embodiment of the present invention described above and may have a recording disk 330 mounted thereon.

The head transfer part 310 may transfer a head 315 detecting information of the recording disk 330 mounted in the spindle motor 100 to a surface of the recording disk of which the information is to be detected.

Here, the head 315 may be disposed on a support portion 317 of the head transfer part 310.

The housing 320 may include a motor mounting plate 322 and a top cover 324 shielding an upper portion of the motor mounting plate 322 in order to form an internal space receiving the spindle motor 100 and the head transfer part 310.

As set forth above, according to the present invention, the spindle motor capable of reducing generation of negative pressure may be provided. That is, the present invention may provide the spindle motor capable of easily connecting the sealing part in which the lipid-vapor interface is disposed and the lower end portion of the bearing clearance to each other.

In addition, the present invention may also provide the motor capable of easily discharging the air included in the lubricating fluid. Particularly, according to the present invention, the air is allowed to be easily separated from the lubricating fluid, such that it may be easy to discharge the air, and air included in the lubricating fluid to be circulated in the bearing clearance again may be reliably removed.

Further, according to the present invention, since the sleeve is composed of the single member, the thrust dynamic pressure groove formation surface and the radial dynamic pressure groove formation surface may be processed so as to be accurately perpendicular to each other, thereby further improving bearing rigidity.

While the present invention has been shown and described in connection with the embodiments, it will be apparent to those skilled in the art that modifications and variations can be made without departing from the spirit and scope of the invention as defined by the appended claims.

What is claimed is:

1. A spindle motor comprising:
 a sleeve supporting a shaft so that an upper end of the shaft protrudes upwardly in an axial direction and a bearing clearance filled with a lubricating fluid formed between the sleeve and the shaft;
 a housing provided so as to enclose an outer peripheral surface of the sleeve and forming a circulation hole between the housing and the sleeve in the axial direction;
 a rotor hub fixedly installed on an upper end portion of the shaft in the axial direction and comprising an extension wall part protruding downwardly from the rotor hub in the axial direction and facing the sleeve and the housing in a radial direction;
 a sealing part on which a liquid-vapor interface is disposed is formed between the housing and the extension wall part in a radial direction; and
 a connection part is formed in the radial direction, the connection part connecting the sealing part and the circulation hole to be in communication with each other and an outer end of the connection part in the radial direction being connected to the sealing part.

2. The spindle motor of claim 1, wherein the sleeve comprises a flange part protruding in the outer diameter direction at an upper portion thereof in the axial direction, and
 wherein the connection part is formed between a first facing surface provided in a circumferential direction at a lower face of the flange part in the axial direction and a second facing surface provided in the circumferential direction at an upper face of the housing in the axial direction so as to be spaced apart from the first facing surface by a predetermined interval.

3. The spindle motor of claim 2, wherein an outer side of the connection part in the radial direction is inclined upwardly in the axial direction.

4. The spindle motor of claim 1, wherein a cover member preventing leakage of the lubricating fluid is fixedly installed on a bottom surface of the housing.

5. The spindle motor of claim 1, wherein at least one of a lower surface of the rotor hub and an upper surface of the sleeve facing the lower surface of the rotor hub is formed with an upper thrust dynamic pressure groove for generating thrust fluid dynamic pressure.

6. The spindle motor of claim 5, wherein a lower end of the shaft is provided with a stopper protruding in an outer diameter direction to thereby be caught by a lower end of the sleeve.

7. The spindle motor of claim 6, wherein at least one of a lower surface of the sleeve and an upper surface of the stopper facing the lower surface of the sleeve is provided with a lower thrust dynamic pressure groove for generating thrust fluid dynamic pressure.

8. The spindle motor of claim 2, wherein the connection part is continuously provided in the circumferential direction.

9. A hard disk drive comprising:
the spindle motor of claim 1 rotating a disk by power applied through a substrate;
a magnetic head writing data to and reading data from the disk; and
a head transfer part transferring the magnetic head to a predetermined position above the disk.

* * * * *